US007468785B2

(12) United States Patent
Lieberman

(10) Patent No.: US 7,468,785 B2
(45) Date of Patent: Dec. 23, 2008

(54) ENHANCED TRIANGULATION

(75) Inventor: Klony Lieberman, Jerusalem (IL)

(73) Assignee: Lumio Inc, Menlo Park, CA (US)

( * ) Notice: Subject to any disclaimer, the term of this patent is extended or adjusted under 35 U.S.C. 154(b) by 0 days.

(21) Appl. No.: 11/779,893

(22) Filed: Jul. 19, 2007

(65) Prior Publication Data

US 2008/0192015 A1 Aug. 14, 2008

Related U.S. Application Data

(60) Provisional application No. 60/889,746, filed on Feb. 14, 2007.

(51) Int. Cl.
*G01C 5/00* (2006.01)

(52) U.S. Cl. .................................................... 356/3.14

(58) Field of Classification Search ....... 356/3.01–3.15, 356/4.01–4.1, 5.01–5.15, 6–22
See application file for complete search history.

(56) References Cited

U.S. PATENT DOCUMENTS 4,865,443 A 9/1989 Howe et al.
6,954,197 B2 10/2005 Morrison et al.
7,268,774 B2 9/2007 Pittel et al.
2003/0174305 A1* 9/2003 Kasper et al. .............. 356/3.09
2005/0088424 A1 4/2005 Morrison et al.
2007/0109527 A1* 5/2007 Wenstrand .................. 356/3.1

* cited by examiner

*Primary Examiner*—Thomas H Tarcza
*Assistant Examiner*—Luke D Ratcliffe

(57) ABSTRACT

Apparatus for information input to a computing device including imaging sensors arranged to simultaneously view an input region and enhanced triangulation signal processing circuitry receiving signal outputs from two of the imaging sensors, which signal outputs contain information indicating an angular position of an object relative to each of the two imaging sensors and information representing angles respectively subtended by the object with respect to each of the two imaging sensors, useful for indicating a relationship between the angles respectively subtended by the object with respect to each of the two imaging sensors, the enhanced triangulation signal processing circuitry providing an object location output based not only on the information indicating an angular position of the object but also on the relationship between the angles respectively subtended by the object.

14 Claims, 2 Drawing Sheets

116
112
114
110
104
118
102
Y
D
C
X
118
B
A
120
108
122
0
106
0
105
108
106
122

130
TRIANGULATION PROCESSOR
X,Y
134
WEIGHTING FACTOR PROCESSOR
X,Y POSITION
132
RELATIONSHIP PROCESSOR
X

FIG. 2A
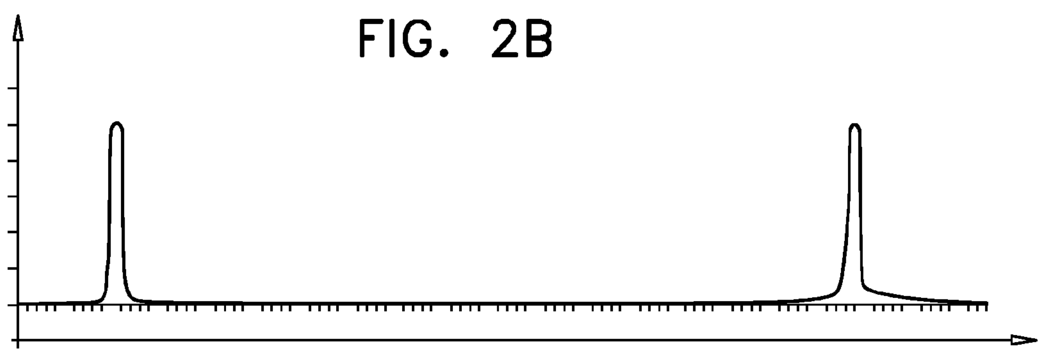
FIG. 2B
FIG. 2C
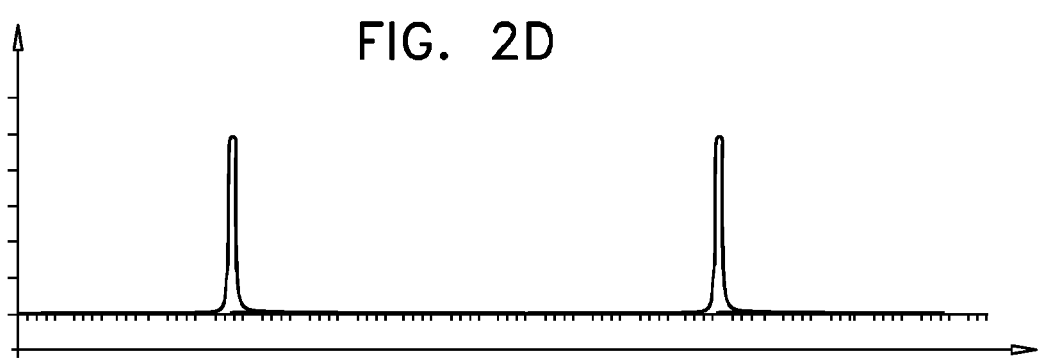
FIG. 2D

ENHANCED TRIANGULATION

REFERENCE TO RELATED APPLICATIONS

Reference is made to U.S. Provisional Patent Application Ser. No. 60/889,746, filed Feb. 14, 2007 and entitled TRIANGULATION WITH ENHANCED RESOLUTION, the disclosure of which is hereby incorporated by reference and priority of which is hereby claimed pursuant to 37 CFR 1.78 (a) (4) and (5)(i).

Reference is made to U.S. patent application Ser. No. 11/691,510, filed Mar. 27, 2007 and entitled OPTICAL TOUCH SCREEN, the disclosure of which is hereby incorporated by reference.

FIELD OF THE INVENTION

The present invention relates to apparatus and methodologies for inputting information into a computing device.

BACKGROUND OF THE INVENTION

The following publications are believed to represent the current state of the art: U.S. Pat. No. 6,954,197; U.S. Published Patent Applications 2005/0088424 and 2007/0109527.

SUMMARY OF THE INVENTION

The present invention seeks to provide improved apparatus and methodologies for inputting information into a computing device.

There is thus provided in accordance with a preferred embodiment of the present invention apparatus for information input to a computing device including imaging sensors arranged to simultaneously view an input region and enhanced triangulation signal processing circuitry receiving signal outputs from two of the imaging sensors, which signal outputs contain information indicating an angular position of an object relative to each of the two imaging sensors and information representing angles respectively subtended by the object with respect to each of the two imaging sensors, useful for indicating a relationship between the angles respectively subtended by the object with respect to each of the two imaging sensors, the enhanced triangulation signal processing circuitry providing an object location output based not only on the information indicating an angular position of the object but also on the relationship between the angles respectively subtended by the object.

Preferably, the information useful for indicating a relationship between angles respectively subtended by the object with respect to each of the two imaging sensors includes information indicating a ratio between angles respectively subtended by the object with respect to each of the two imaging sensors. Additionally, the information indicating a ratio between angles respectively subtended by the object with respect to each of the two imaging sensors indicates the relative distance to the two imaging sensors of a perpendicular projection of the object onto a straight line connecting the two imaging sensors. Alternatively or additionally, the information useful for indicating a ratio between angles respectively subtended by the object with respect to each of the two imaging sensors indicates the coordinate of the object along an axis defined by a straight line connecting the two imaging sensors.

Preferably, when the object is located along a straight line connecting the two imaging sensors the ratio thus indicates the relative distance between the object and the two imaging sensors.

Preferably, the object location output includes a weighting of the information indicating an angular position of the object and the relationship between the angles respectively subtended by the object. Additionally, the weighting is based on the information indicating an angular position of the object.

There is also provided in accordance with another preferred embodiment of the present invention a method for sensing information input to a computing device including arranging imaging sensors to simultaneously view an input region, providing signal outputs from two of the imaging sensors, which signal outputs contain information indicating an angular position of an object relative to each of the two imaging sensors and information representing angles respectively subtended by the object with respect to each of the two imaging sensors, useful for indicating a relationship between the angles respectively subtended by the object with respect to each of the two imaging sensors and providing an object location output based not only on the information indicating an angular position of the object but also on the relationship between the angles respectively subtended by the object.

Preferably, the providing signal outputs includes indicating a ratio between angles respectively subtended by the object with respect to each of the two imaging sensors. Additionally, the indicating a ratio between angles respectively subtended by the object with respect to each of the two imaging sensors includes indicating the relative distance to the two imaging sensors of a perpendicular projection of the object onto a straight line connecting the two imaging sensors. Alternatively or additionally, the providing signal outputs includes indicating the coordinate of the object along an axis defined by a straight line connecting the two imaging sensors.

Preferably, when the object is located along a straight line connecting the two imaging sensors the ratio thus indicates the relative distance between the object and the two imaging sensors.

Preferably, the method also includes weighting of the information indicating an angular position of the object and the relationship between the angles respectively subtended by the object. Additionally, the weighting is based on the information indicating an angular position of the object.

BRIEF DESCRIPTION OF THE DRAWINGS

The present invention will be understood and appreciated more fully from the following detailed description, taken in conjunction with the drawings in which:

FIGS. 2A, 2B, 2C and 2D are each illustrations of superimposed signals received from multiple detectors representing, inter alia, the angle subtended by an object in one of the multiple locations shown in FIG. 1.

DETAILED DESCRIPTION OF A PREFERRED EMBODIMENT

Figure 1:
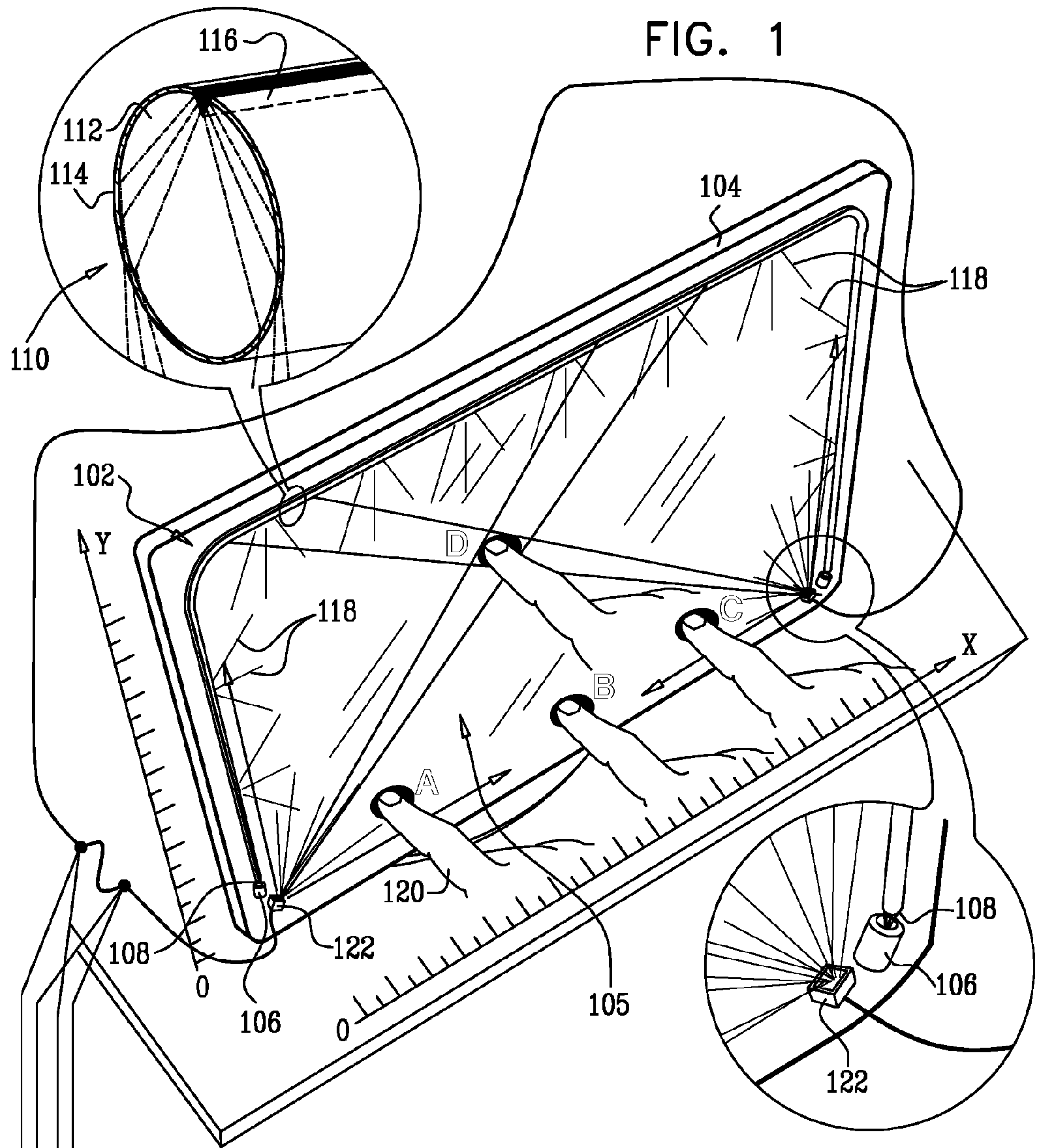
FIG. 1 is a simplified pictorial and schematic illustration of apparatus and methodology for information input to a computing device constructed and operative in accordance with a preferred embodiment of the present invention in use with an object at multiple locations.

Reference is now made to FIG. 1, which is a simplified pictorial and schematic illustration of apparatus and methodology for information input to a computing device constructed and operative in accordance with a preferred embodiment of the present invention in use with an object at multiple locations.

As seen in FIG. 1, the touch screen comprises an optical fiber illumination assembly 102 which is preferably arranged along and above all or part of the periphery of a support 104, typically a glass plate. Alternatively, the glass plate may be obviated and the support 104 may be a frame (not shown). Typically, the optical fiber illumination assembly 102 extends along three of four edges of a detection region 105.

In accordance with a preferred embodiment of the present invention, the optical fiber illumination assembly 102 receives illumination from light sources 106, such as an LED or a diode laser, disposed at each end 108 of assembly 102. Alternatively a single light source 106 may be employed, disposed at one end 108 of the assembly 102.

In accordance with a preferred embodiment of the present invention, the optical fiber illumination assembly 102 comprises at least one optical fiber 110 having a core 112 and cladding 114, such as an ESKA plastic optical fiber commercially available from Mitsubishi, which has a circular cross section. The cladding 114 preferably has at least one light scattering discontinuity 116 at at least one location therealong opposite at least one light transmissive region of the optical fiber at which region the optical fiber has optical power.

In the illustrated embodiment, discontinuity 116 is preferably defined by forming a scratch extending entirely through the cladding 114 along at least a substantial portion of the entire length of the optical fiber illumination assembly 102. The scratch may, but need not necessarily, penetrate into the core 112.

In accordance with a preferred embodiment of the present invention, the optical power of the optical fiber at the at least one light transmissive region and the at least one light scattering discontinuity 116 are operative to direct light received from the light source 106 along the at least one optical fiber 110 and scattered by the at least one light scattering discontinuity 116 through the cladding 114 along a direction generally away from the discontinuity 116, as indicated generally by reference numeral 118.

In accordance with the preferred embodiment of the present invention, the at least one optical fiber extends along a periphery of a light curtain area defined by the detection region 105 and the at least one light scattering discontinuity 116 extends along the periphery, directing light generally in a plane, filling the interior of the periphery and thereby defining a light curtain therewithin.

In an alternative embodiment (not shown), the at least one optical fiber 110 extends along a periphery of a light curtain area defined by the detection region 105 and the at least one light scattering discontinuity 116 includes a plurality of light scattering discontinuities distributed along the periphery, whereby said plurality of light scattering discontinuities direct light generally in a plane, filling the interior of said periphery and thereby together defining a light curtain therewithin.

Impingement of a stylus or finger 120 upon support 104 is sensed by one or more light detectors 122, preferably disposed along an edge of detection region 105 along which the optical fiber illumination assembly 102 does not extend. The detectors detect changes in the light received from the optical fiber illumination assembly 102 produced by the presence of a stylus or finger 120 in the detection region 105. Preferably detectors 122 are located in the same plane as the optical fiber illumination assembly 102. Preferably two detectors are provided, each at an adjacent corner of the detection region 105 and having 90 degree coverage, as shown.

Alternatively, any other suitable touch screen illumination arrangement may be employed and reflection of light rather than blockage of light from the stylus or finger 120 may be detected by detectors 122.

Preferably detectors 122 are each linear CMOS sensors, such as such as an RPLIS-2048 linear image sensor commercially available from Panavision SVI, LLC of One Technology Place, Homer, N.Y., which are suitable for use in triangulation. The outputs of detectors 122 preferably provide not only information indicating an angular position of the stylus or finger 120 but also information regarding angles respectively subtended by the stylus or finger 120 as seen by each of detectors 122.

A triangulation processor 130 receives the outputs of detectors 122 and provides a triangulation output indicating the X,Y position of the stylus or finger 120, in the context of FIG. 1, relative to detectors 122 in two dimensions by using known triangulation techniques. A relationship processor 132 also receives the outputs of detectors 122, which contain information representing angles respectively subtended by the stylus or finger 120 with respect to each of the two detectors 122 and calculate a relationship between said angles respectively subtended by the stylus or finger 120 with respect to each of said two imaging sensors. Preferably, the relationship is a ratio of the angles subtended by the stylus or finger 120 at both detectors.

Referring now additionally to FIGS. 2A, 2B, 2C and 2D, it is seen that FIG. 2A illustrates superimposed output signals from two detectors 122. The widths of the two peaks represent the angles subtended by the stylus or finger 120 viewed by the two detectors 122 when the stylus or finger 120 is in position A as shown in FIG. 1. Similarly FIGS. 2B, 2C and 2D each illustrate superimposed output signals from two detectors 122 where the widths of the respective two peaks therein represent the angles subtended by the stylus or finger 120 viewed by the two detectors 122 when the stylus or finger 120 is respectively in positions B, C and D as shown in FIG. 1.

It may be appreciated from a consideration of FIGS. 2A-2D that the angle subtended by the stylus or finger 120 at a given detector 122 is proportional to the degree of propinquity of the stylus or finger 120 thereto. Relationship processor 132 preferably provides an output which represents the X position of the stylus or finger 120 in the context of FIG. 1.

A weighting factor processor 134 receives the outputs of the triangulation processor 130 and of the relationship processor 132 and combines the positional information contained therein to provide an X,Y position output representing the location of stylus or finger 120. The Y position information of the X,Y position output is based entirely on the output of the triangulation processor 130 and the X position information of the X,Y position output is based on a combination of information contained in the outputs of both the triangulation processor 130 and of the relationship processor 132 based on a weighting factor, which increases the weighting of the output of the relationship processor 132 as Y approaches zero. Thus, it is appreciated that in stylus or finger positions A, B and C shown in FIG. 1, where the stylus or finger 120 lies along a line joining the detectors 122, triangulation does not provide any X position information.

It will be appreciated by persons skilled in the art that the present invention is not limited to what has been particularly shown and described hereinabove. Rather, the present invention includes combinations and subcombinations of features described above as well as modifications thereto which would occur to persons skilled in the art upon reading the foregoing description and which are not in the prior art.

The invention claimed is:

1. Apparatus for information input to a computing device comprising:

imaging sensors arranged to simultaneously view an input region; and enhanced triangulation signal processing circuitry receiving signal outputs from two of said imaging sensors, which signal outputs contain information indicating an angular position of an object relative to each of said two imaging sensors and information representing angles respectively subtended by said object with respect to each of said two imaging sensors, useful for indicating a relationship between said angles respectively subtended by said object with respect to each of said two imaging sensors, said enhanced triangulation signal processing circuitry providing an object location output based not only on said information indicating an angular position of said object but also on said relationship between said angles respectively subtended by said object.

2. Apparatus for information input to a computing device according to claim 1 and wherein said information useful for indicating a relationship between angles respectively subtended by said object with respect to each of said two imaging sensors comprises information indicating a ratio between angles respectively subtended by said object with respect to each of said two imaging sensors.

3. Apparatus for information input to a computing device according to claim 2 and wherein said information indicating a ratio between angles respectively subtended by said object with respect to each of said two imaging sensors indicates the relative distance to said two imaging sensors of a perpendicular projection of said object onto a straight line connecting said two imaging sensors.

4. Apparatus for information input to a computing device according to claim 2 and wherein said information useful for indicating a ratio between angles respectively subtended by said object with respect to each of said two imaging sensors indicates the coordinate of said object along an axis defined by a straight line connecting said two imaging sensors.

5. Apparatus for information input to a computing device according to claim 2 and wherein when said object is located along a straight line connecting said two imaging sensors said ratio thus indicates the relative distance between said object and said two imaging sensors.

6. Apparatus for information input to a computing device according to claim 1 and wherein said object location output comprises a weighting of said information indicating an angular position of said object and said relationship between said angles respectively subtended by said object.

7. Apparatus for information input to a computing device according to claim 6 and wherein said weighting is based on said information indicating an angular position of said object.

8. A method for sensing information input to a computing device comprising:

arranging imaging sensors to simultaneously view an input region; and providing signal outputs from two of said imaging sensors, which signal outputs contain information indicating an angular position of an object relative to each of said two imaging sensors and information representing angles respectively subtended by said object with respect to each of said two imaging sensors, useful for indicating a relationship between said angles respectively subtended by said object with respect to each of said two imaging sensors; and providing an object location output based not only on said information indicating an angular position of said object but also on said relationship between said angles respectively subtended by said object.

9. A method for sensing information input to a computing device according to claim 8 and wherein said providing signal outputs comprises indicating a ratio between angles respectively subtended by said object with respect to each of said two imaging sensors.

10. A method for sensing information input to a computing device according to claim 9 and wherein said indicating a ratio between angles respectively subtended by said object with respect to each of said two imaging sensors comprises indicating the relative distance to said two imaging sensors of a perpendicular projection of said object onto a straight line connecting said two imaging sensors.

11. A method for sensing information input to a computing device according to claim 9 and wherein said providing signal outputs comprises indicating the coordinate of said object along an axis defined by a straight line connecting said two imaging sensors.

12. A method for sensing information input to a computing device according to claim 9 and wherein when said object is located along a straight line connecting said two imaging sensors said ratio thus indicates the relative distance between said object and said two imaging sensors.

13. A method for sensing information input to a computing device according to claim 8 and also comprising weighting of said information indicating an angular position of said object and said relationship between said angles respectively subtended by said object.

14. A method for sensing information input to a computing device according to claim 13 and wherein said weighting is based on said information indicating an angular position of said object.

* * * * *